UNITED STATES PATENT OFFICE 2,463,501

MANUFACTURE OF PARA PHENYL PHENOL RESINS

James A. Arvin, Homewood, Ill., assignor to The Sherwin-Williams Company, Cleveland, Ohio, a corporation of Ohio No Drawing. Application January 28, 1944, Serial No. 520,102

9 Claims. (Cl. 260—51)

The present invention relates to the manufacture of condensation products and synthetic resins by reaction of p-phenyl phenol and formaldehyde.

Reference is made to a process of forming resin by reaction in the presence of an acid catalyst, or alkyl phenol, such as octyl phenol and tertiary butyl phenol, both of which are liquid at 212° F. and below, with aqueous formaldehyde, such as Formalin. The reaction of such liquid phenols with aqueous formaldehyde solution is difficult to effect, where the phenol is not soluble in the Formalin and thus forms two phases. According to the cited process, which is described by James V. Hunn in U. S. Ser. No. 346,805, filed July 22, 1940, now Patent No. 2,330,217, issued September 28, 1943, a small amount of surface active wetting agent is added to the initial reaction mass. This functions to promote contact between the two liquid phases, and thereby effects or expedites the reaction. Where said wetting agent is one containing a sulfo group, such as one which is a sulfonic acid, or a sulfonate salt, and when the reaction is so performed as to retain said wetting agent with the resulting condensation product after removing water and attaining a temperautre well over 212° F., the mass is heated further to advance or harden the resin. With this heating a further reaction takes place which is generally exothermic in nature and is believed to be due to decomposition of the wetting agent, thereby providing an acid of sulfur which acts as an acid catalyst for the hardening process.

The above described procedure applicable to the alkyl phenols which are fluid at the reaction temperature is not readily applicable to p-phenyl phenol. The latter is normally solid and melts at 329° F. Where it is desired to condense it with formaldehyde in aqueous solution, such as Formalin, at atmospheric pressure or higher and at temperatures up to 212° F. and higher but yet below the melting point, the quantities preferably employed (1 mole of the phenol and from 0.65 to 1.0 mole of formaldehyde) give only a very slowly reactive paste. This paste is difficult to stir in ordinary apparatus, and it reacts quite slowly even when a suitable wetting agent is added to facilitate contact.

The present invention has for its object the condensation of p-phenyl phenol and aqueous formaldehyde at temperatures substantially below the melting point of the solid p-phenyl phenol (329° F.).

It is also an object to effect the reaction between p-phenyl phenol and formaldehyde at atmospheric pressure in an aqueous medium.

It is a particular object of the invention to add to p-phenyl phenol a water-immiscible agent which dissolves the p-phenyl phenol and provides a liquid phase containing at least part of the phenol in contact with a liquid phase of formaldehyde, which two contacting liquid phases are responsive to wetting by a suitable wetting agent for rendering them more reactive.

It is a particular object of the invention to provide a volatile organic solvent, which is chemically inert in the process, as diluent for the p-phenyl phenol to bring the latter into a liquid phase for the reaction.

It is another particular object of the invention to use a solvent or diluent for the p-phenyl phenol, which may include a phenol reactive with formaldehyde, which diluent and p-phenyl phenol provide a relatively low-melting mixture having the p-phenyl phenol in a fluid phase for the desired reaction with the aqueous formaldehyde.

Numerous other and ancillary objects and advantages of the invention will become apparent from the following description and explanation thereof.

In carrying out the invention using a volatile organic solvent as all or part of the diluent, the p-phenyl phenol may be brought entirely into a liquid phase at the beginning of the reaction by the addition of sufficient volatile solvent. But in some cases this necessitates the use of objectionably large amounts of such solvent, which must be removed by distillation at the end of the reaction. For example, at 212° F., about 5 parts of xylol or about 7 parts of hydrogenated naphtha by weight are required to dissolve one part of p-phenyl phenol. However, it has been found that by adding only a small fraction of the amount of solvent necessary to effect complete solution, the reaction can be initiated in a three phase system consisting of (1) a solid phase of part of the p-phenyl phenol, (2) a liquid or heavy fluid phase of solvent in which some of the p-phenyl phenol is dissolved, and (3) a liquid phase of the aqueous formaldehyde. As the reaction proceeds and the dissolved p-phenyl phenol is reacted with the formaldehyde, the solvent constantly exercises its solvent power by dissolving more of the solid phase, until the solid phase disappears. The reaction product is in a liquid phase at the reaction temperature, and the constantly increasing amount of it appears to assist in dissolving the remaining unreacted p-phenyl phenol. When a wetting agent is present, the initial reaction is induced to progress rapidly; and toward the end of the reaction a syrupy phase appears and a heavy emulsion forms. When the reaction has proceeded to the point where the reaction mixture has been converted to a syrupy condition and a sample will form at least a heavy cream when cooled, the solvent and water are distilled off, and the residual resin is heated to a suitable hardening point. Where the active wetting agent of the initial reacting mass contains a sulfo radical, a second stage of the reaction takes place on further heating to harden the resulting resin in the manner and with the advantages described in the said patent to Hunn.

Resins deriving from p-phenyl phenol can be made by this process with melting points ranging from below 140° F. to as high as 280° F., without encountering serious difficulty in stirring the reaction mixture.

A number of different organic solvents may be employed in the process of this invention with satisfactory results. The principal factors governing their suitability are their solvent and phase-forming values for p-phenyl phenol, and their boiling points. Their solubility in water is also of interest from the standpoint of economy of operation, for those solvents which are insoluble or but slightly soluble in water may be more readily separated from the water for re-use after both have been distilled from the reaction mixture.

The final condensation product has a high affinity for volatile solvents of the types herein disclosed, making it difficult to remove the solvent during the distilling operation. It is for this reason that relatively small quantities of solvent are preferably employed, and the more powerful solvents for p-phenyl phenol make it possible to keep the amount of solvent to the minimum consistent with ease of stirring and with reasonably rapid reaction.

The preferred diluents are the volatile unreactive ones which have poor or no solubility in water and which readily form two liquid phases with aqueous formaldehyde. However, there are suitable diluents which, while wholly miscible with water in some but not necessarily all proportions, partition themselves between two adjacent liquid phases, this resulting, for example in the case of methyl ethyl ketone, from the solubility of water in the diluent, and from the solubility of the diluent in water, each providing different and immiscible liquids. Temperature changes and proportions sometimes determine the existence of one or two phases, in such cases. Methyl ethyl ketone is more soluble in cold water than in hot, and a single liquid phase of the two may be made which forms two phases on merely heating.

sired point. In this connection it should be noted that the presence of water in the reaction mixture reduces the normal distillation temperature of higher boiling solvents. If a large portion of the solvent remains after the resin reaches 250° F., other procedures for its removal may be adopted, such as steam or vacuum distillation carried out sufficiently rapidly so that the resin does not harden beyond the desired degree at the distillation temperature employed. For some uses it may be unnecessary to remove all of the solvent from the final resin product.

Among the suitable solvents, in the order of their preference for reactions at atmospheric pressure, may be named xylol, toluol, and benzol. A xylol which has been found to be highly satisfactory is the commercial crude cut of xylol, but any of its isolated isomeric forms may also be used. The crude cut which has been used in some of the following examples may be identified as follows:

|  | ° C. |
|---|---|
| Initial boiling point | 130 |
| 5% over at | 133 |
| 50% over at | 136 |
| 95% over at | 140 |

Specific gravity, 0.862

Xylol is a preferred solvent for reaction at atmospheric pressure because, in the initial stage of the condensation, where a refluxing apparatus is used, the water-xylol mixture refluxes at 208–212° F. Toluol and benzol, though they may be used with satisfactory results, are comparably less desirable because they lower the reflux temperature, prolong the time of the reaction, and are lost earlier than desired at the end of the water-distilling period, whereby larger amounts of solvent are required to reduce the viscosity of the mixture for convenience of manipulation. Xylol, on the other hand, is in part held in the mixture up to about 250° F., which facilitates stirring throughout the initial reaction period. Benzol boils at atmospheric pressure at about 175° F., which is about the lowest temperature at which the initial condensation can be carried out within a reasonable length of time, regardless of the pressure employed.

Any volatile organic solvent which is unreactive with formaldehyde and with the phenol and which can be distilled off, by some expedient, by the time the resin reaches 250° F. may be employed. Hydrogenated naphtha and high flash naphtha having approximately the following characteristics (see Table 1) may be mentioned as additional examples:

TABLE 1

| Solvent | Specific Gravity | Boiling Range in °C. at Atmospheric Pressure | | | | | Kauri Butanol No. |
|---|---|---|---|---|---|---|---|
|  |  | Initial B. P. | 5% over | 50% over | 95% over | End |  |
| Hydrogenated Naphtha | .824 to .854 | 95 to 135 | 102 to 140 | 108 to 150 | 125 to 165 | 136 to 190 | 78 to 85 |
| High Flash Naphtha | .875 | 148 | 150 | 160 | 175 | 190 | 78 |

The preferred solvents for operating at normal atmospheric pressure, are those which are sufficiently volatile to be largely distilled off by the time the resin reaches 250° F. and yet which are not so volatile as to require the use of a closed chamber to keep them in the reaction mixture until the reaction has proceeded to the desired point.

The high flash naphtha identified in Table 1 represents a solvent having about the highest practical boiling range for operating at atmospheric pressure, and, though capable of being used in accordance with the present invention, it is not a preferred solvent for the preferred atmospheric pressure operations, because of the difficulties involved in distilling it from the reaction mixture. As previously noted, it is difficult to employ at atmospheric pressure a solvent boiling at much below 175° F. (79.4° C.). The preferred solvents for use in accordance with the preferred operating conditions of atmospheric pressure may, therefore, be said to include solvents boiling between about 170° F. (77° C.) and about 375° F. (190.6° C.). A preferred range would include solvents boiling between about 200° F. and about 300° F. Obviously these ranges are only approximate and do not designate critical limitations on the scope of this invention.

While only solvents or diluents unreactive with formaldehyde have been mentioned above, it is possible to eliminate such unreactive solvents in whole, but preferably only in part, by substituting formaldehyde-reactive phenols which are lower melting than the p-phenyl phenol, while keeping the ratio of total phenol to formaldehyde unchanged, or at least within the approximate limits of about 0.65 to 1 mole of formaldehyde for each mole of phenol (for reasons hereinafter explained). When a mixture of phenols, including the p-phenyl phenol, is used in this invention, the phenols should be so chosen that there is a mixture containing them which is liquid, as a separate fluid phase at the reaction temperature. Each of the phenols of the mixture should have two or more positions reactive with formaldehyde. The final condensation product, of course, will then include a mixed resin resulting from any such phenol added to the p-phenyl phenol.

Where mixtures of phenols are employed, the p-phenyl phenol may be present in any desired proportion. If the mixture of phenols to be employed would normally be solid or nearly solid at the selected reaction temperature, a volatile non-phenolic inert solvent may also be used, as described above, in sufficient quantity to facilitate manipulation of the reaction mixture and to speed up the reaction to the desired rate. By using mixtures of phenols, the properties of the final resin may be considerably varied for different uses. For example, a resin derived from 60 parts of p-phenyl phenol, 30 parts of butyl phenol, and 10 parts of phenol, will body drying oils faster than one derived from p-phenyl phenol as the only phenolic constituent.

This invention is capable of variation in so many ways as regards the specific materials employed and their proportions, the time and temperature of the reactions, and the physical and chemical properties of the final product, that only a relatively few examples can be given herein. However, the following examples will suffice to teach the practical application of the invention in all of its various ramifications. In these examples, the Formalin employed was a commercial solution containing about 37.5% formaldehyde by weight.

EXAMPLE I

| | Grams |
|---|---|
| p-Phenyl phenol | 945 |
| Formalin | 378 |
| Xylol | 168 |
| Oxalic acid | 3.74 |
| Wetting agent (see Tables 2 and 3) | |

With variations as shown in Table 3 below, the above ingredients were placed in a 5 liter flask fitted with thermometer, reflux condenser, and agitator. The contents were heated to a reflux temperature of 202–212° F. at atmospheric pressure, and held until a sample formed a sticky plastic pill when cooled. The water and xylol were then distilled off at atmospheric pressure with further heating, and the heating was continued to a final temperature in the range of 260–310° F. and held until a desired bar melting point of a test sample in the range of 185–260° F. was attained. An exothermic reaction began at a temperature in the range of 230–260° F.

The foregoing experiment was performed with each of the wetting agents in Table 2, which agents, for convenience, are referred to in Table 3 by the numbers assigned to them in Table 2. (Reference is made to a published list of many such surface-active wetting agents in Industrial and Engineering Chemistry, vol. 33, January, 1941, pages 16–22.) The variations resulting from the use of different wetting agents are shown in Table 3.

TABLE 2

Wetting agents

| Assigned Number | Trade Name | Per Cent Non-Volatile Matter | Chemical Identity | Manufactured By |
|---|---|---|---|---|
| 1 | Aerosol O. T | 100 | Dioctyl ester of sulfo-succinic acid sodium salt | American Cyanamid Co. |
| 2 | Aerosol O. S | 100 | Alkyl aryl sodium sulfonate | Do. |
| 3 | Alkanol WXN | 35 | Sodium salt of sulfonate hydrocarbons | E. I. du Pont de Nemours |
| 4 | Neomerpin N | 35 | Alkyl naphthalene sulfonic acid | Do. |
| 5 | Tergitol Penetrant 08 | 35 | Sodium salt of higher primary alkyl sulfate | Carbide and Carbon Chemicals Corp. |

TABLE 3

Use of wetting agents

| Wetting Agent | | Holding Time [1] | | Distillation Time | | Max. Temp., ° F. | Time at Max. Temp., Min. | Final Melting Point, ° F. |
|---|---|---|---|---|---|---|---|---|
| No. | Amount, Grams | Hrs. | Min. | Hrs. | Min. | | | |
| 1 | 4.12 | 2 | 10 | 1 | 50 | 275 | 10 | 225 |
| 2 | 2.00 | 1 | 45 | 1 | 30 | 260 | 15 | 235 |
| 3 | 9.11 | 2 | 10 | 2 | 45 | 300 | 30 | 217 |
| 4 | 4.10 | 2 | 10 | 3 | ---- | 263 | 5 | 235 |
| 5 | 48.6 | 9 | ---- | 3 | 10 | 310 | 15 | 210 |

[1] 200–212° F. before distillation.

In the variations of the foregoing example the molal ratio of phenol to formaldehyde was 1 to 0.85. The yields ranged from 990 to 1025 grams.

EXAMPLE II

|  | Grams |
|---|---|
| p-Phenyl phenol | 945 |
| Formalin | 288 |
| Xylol | 168 |
| Oxalic acid | 3.74 |
| Aerosol O.T. | 2.93 |

The above ingredients were treated in the same apparatus and by the same procedure described in Example I. The initial holding period was 4 hours at the reflux temperature; the second holding period was 30 minutes at 300° F., and the bar melting point of the product was 170° F. The yield was 1022 grams. This example illustrates the use of a phenol to formaldehyde molal ratio of 1 to 0.65.

EXAMPLE III

|  | Grams |
|---|---|
| p-Phenyl phenol | 850 |
| Formalin | 380 |
| Benzol | 262 |
| Oxalic acid | 4.6 |
| Aerosol O. T. | 3.6 |

The above ingredients were put together in the same apparatus used in Example I and treated by the same general procedure through the first reaction period. The initial reflux temperature was 150° F., but it rose gradually to 170° F. in 2 hours and 45 minutes. At this point a separator was attached to permit the distillation of the solvent. Water which distilled was returned to the reaction vessel during the distillation of 240 grams of benzol, and the reflux temperature rose to 210° F. After refluxing at this temperature for half an hour, distillation was resumed to remove the water. The temperature was raised to 300° F., and the melting point of the resin rose rapidly. The final bar melting point was 250° F. The yield was 914 grams.

The foregoing example illustrates the use of a low boiling solvent at atmospheric pressure, and use of a phenol to formaldehyde molal ratio of 1 to 0.95.

EXAMPLE IV

|  | Grams |
|---|---|
| p-Phenyl phenol | 810 |
| p-Butyl phenol | 378 |
| 1-3-5-xylenol | 162 |
| Formalin | 618 |
| Oxalic acid | 2.25 |
| Aerosol O. T. | 2.70 |

The phenols and Formalin were first put in a flask of Example 1, and agitated, after which the oxalic acid and wetting agent were added. The mixture was heated to reflux temperature at atmospheric pressure and held for about 90 minutes for a semi-brittle pill. The water was then distilled off at atmospheric pressure and the mixture heated up to 275° F. until a bar melting point of 207° F. was attained. The molal ratio of phenol to formaldehyde is 1 to .9. The yield was 1410 grams.

The foregoing example illustrates the use of two relatively low melting phenols in place of a volatile non-phenolic solvent.

EXAMPLE V

|  | Grams |
|---|---|
| p-Phenyl phenol | 225 |
| p-Tertiary butyl phenol | 189 |
| Diphenylol propane | 36 |
| Solvesso No. 1 | 75 |
| Formalin | 219 |
| Oxalic acid | 1.12 |
| Aerosol O. T. | 0.86 |

Again following the general procedure of Example I, the above materials were first held at the reflux temperature for 1 hour and 50 minutes and then held for 7 minutes at 300° F. The bar melting point of the product was 278° F., and the yield was 475 grams.

The foregoing example illustrates the use of a mixture of phenols and a solvent, with a phenol-formaldehyde molal ratio of 1 to 1, to produce a very high melting point resin. The solvent Solvesso No. 1, is a hydrogenated naphtha having physical properties falling within the ranges set forth for that material in Table 1, above. "Solvesso No. 1" is a trade name of the Standard Oil Company.

EXAMPLE VI

|  | Grams |
|---|---|
| p-Phenyl phenol | 225 |
| p-Tertiary butyl phenol | 189 |
| Mixed meta and para Cresol | 36 |
| Solvesso No. 1 | 30 |
| Formalin | 221 |
| Oxalic acid | 0.75 |
| Aerosol O. T. | 0.86 |

Again following the general procedure of Example 1, the above materials, except for the cresol, were first held at the reflux temperature for one hour and 13 minutes. The cresol was added and refluxing was continued for 27 minutes. The water and solvent were distilled and the mixture was held at the final temperature of 300° F. for 23 minutes. The bar melting point was 261° F., and the yield was 481 grams.

This last example illustrates still another combination of diluent including both relatively low melting phenol and an organic hydrocarbon solvent. The cresol, however, did not perform the usual diluent function in this particular case because it was added after refluxing had been nearly completed. This was done to compensate for the fact that it reacts with formaldehyde much faster than the other phenols employed, and it was desired to maintain a nearly uniform phenol-formaldehyde ratio in the final product for each of the phenols.

EXAMPLE VII p-Phenyl phenol (per Table 4)
p-Tertiary butyl phenol (per Table 4)
Formalin (per Table 4)
Oxalic acid (per Table 4)
Aerosol O. T. (per Table 4)

Four variations, a through d, were run with the above ingredients particularly to vary the ratio of the two phenols as shown in Table 4. The amount of formaldehyde was also varied since it was desired to maintain a constant phenol to formaldehyde molal ratio of 1 to 0.9. The phenols and Formalin were first put in the flask of Example 1, and after agitating, the oxalic acid and wetting agent were added. The mixture was then heated to its reflux temperature at atmospheric pressure and held for the time shown in Table 4 until a cooled sample formed a brittle pill. The water was then distilled off at atmospheric pressure and the temperature gradually raised to 300° F., at which point it was held until the melting point shown in Table 4 was attained.

TABLE 4

| Example | VIIa | VIIb | VIIc | VIId |
|---|---|---|---|---|
| Grams of p-Phenyl Phenol | 225 | 450 | 787 | 675 |
| Grams of p-Butyl Phenol | 675 | 450 | 473 | 225 |
| Grams of Oxalic Acid | 2.25 | 2.25 | 4.2 | 3.0 |
| Grams of Formalin | 418 | 412 | 560 | 394 |
| Grams of Aerosol O. T | 2.0 | 2.0 | 3.67 | 2.67 |
| Initial Holding Period, hours | 1.75 | 1.83 | 1.90 | 1.83 |
| Hoding Period 300° F., minutes | 30 | 15 | 10 | 10 |
| Final Bar M. P., °F | 261 | 251 | 241 | 237 |
| Yield, Grams | 911 | 943 | 1334 | 957 |

The foregoing example illustrates the use of a relatively low melting phenol in place of a volatile solvent.

EXAMPLE VIII

|  | Grams |
|---|---|
| p-Phenyl phenol | 720 |
| p-Butyl phenol | 360 |
| Phenol | 120 |
| Formalin | 570 |
| Oxalic acid | 2.0 |
| Aerosol O. T | 2.3 |

The procedure of Example IV was repeated substantially without change except that the ingredients and amounts thereof were changed as noted above. The final bar melting point was 205° F., and the yield was 1288 grams.

The foregoing example illustrates another combination of relatively low melting phenols used without any volatile non-phenolic solvent.

EXAMPLE IX

|  | Grams |
|---|---|
| p-Phenyl phenol | 765 |
| p-Amyl phenol | 246 |
| Formalin | 486 |
| Oxalic acid | 3.0 |
| Aerosol O. T | 2.3 |

Following the same general procedure described in connection with Examples IV and VII the above materials were first held for an hour and 55 minutes at the reflux temperature. The second holding period was 20 minutes at 300° F. The final bar melting point was 251° F. The yield was 1080 grams. The molal ratio of phenol to formaldehyde was 1 to 0.95 in this case. The p-phenyl phenol comprised 75.6% of the total phenol.

EXAMPLE X

|  | Grams |
|---|---|
| p-Phenyl phenol | 1008 |
| o-Phenyl phenol | 252 |
| Formalin | 563 |
| Oxalic acid | 6.66 |
| Aerosol O. T | 5.4 |

The treatment of Example IX was repeated substantially as described therein, all at atmospheric pressure, and 1354 grams of resin having a bar melting point of 208° F. were obtained. In this case the p-phenyl phenol comprised 80% of the total phenol, and the molal ratio of phenol to formaldehyde was 1 to 0.95.

In all of the foregoing examples, oxalic acid was used as a representative acid catalyst, but it is to be understood that other acids may be used in place thereof. Numerous suitable organic and mineral acids for catalyzing phenol-formaldehyde reactions are well known in the art, many of which, such as phosphoric acid, sulfuric acid, toluene sulfonic acid and hydrochloric acid, are considerably stronger catalysts than oxalic acid and, therefore, may be used in lower concentration. Maleic acid, dichloracetic acid and trichloracetic acid are other useful acid catalysts.

Heretofore, p-phenol phenol has been reacted with formaldehyde by using an excess of formaldehyde and super atmospheric pressure. The excess formaldehyde is highly objectionable because control of the amount of formaldehyde combining with the phenol is made more difficult. If too great an amount of formaldehyde is caused to combine with the phenol, the reaction mass may become too stiff to handle conveniently on a production scale, and one of the primary objects of this invention is not accomplished. Thus, 0.65 mole of formaldehyde to 1 mole of phenol is the minimum amount of formaldehyde that will give a resin of the desired characteristics, and the upper limit of the preferred range (1 mole of formaldehyde to 1 mole of phenol) is determined by convenience in handling the reaction mixture, and also by the fact that no more than this is needed when using the present invention at atmospheric pressure. The use of high pressures, while permissible, also complicates the physical operations and requires more expensive equipment than the process described herein. By the preferred atmospheric pressure operations, the ratio of formaldehyde to phenol in the final product is readily controlled, the operations are simpler and cheaper, and resins of high molecular weight (evidenced by melting point) are easily prepared.

In carrying out the process of the present invention, the residue remaining after distillation and still containing the wetting agent, may be removed before the exothermic reaction occurs and cooled to provide a solid resin product. This product may be further heated at some subsequent time to cause the second stage of the reaction to occur and to raise the melting point of the final product. If this is done, suitable material containing a sulfo group, such as one of the wetting agents, or for example toluene sulfonic acid may be added.

The second stage of the reaction, which generally is more or less exothermic in nature, occurs when the resin is further heated after the distillation step and is often evidenced during said further heating by an increase in the rate of temperature rise from internal causes. It is believed that a new acid catalyst is generated by thermal decomposition of the wetting agent having a sulfo group, thereby affecting the rate and degree of resinification and causing the second stage of the reaction to occur. The resin may be cooled for final recovery at any time after the second stage of the reaction has been initiated, either before or after its completion. In this manner the melting point of the final product is subject to variation for any given set of ingredients and prior operating conditions. The second stage of the reaction may begin any place within a temperature range of about 225° to 275° F. depending on the several variables which effect the other details of the reaction.

As brought out in the Hunn patent, and as explained above, the sulfo group of the wetting agent exercises its particular function when the wetting agent partially decomposes at the high temperature of the final reaction. As is to be expected, therefore, it is not essential to carrying out the first reaction successfully that the wetting agent employed contain a sulfo group. Thus, the original reaction mixture may make use of other types of wetting agents, such as "Tween 80" made by the Atlas Powder Co. of Wilmington, Delaware.

(This trade name identifies a sorbitan monooleate polyoxyalkylene derivative.) After the first reaction has run its course and before heating the product thereof to the temperature at which the second stage of the reaction is to begin, a suitable material containing the necessary sulfo group may be added. This material, for example, may be one of the wetting agents employed in the foregoing specific examples, or it may be a material such as toluene sulfonic acid. As another alternative, material containing a sulfonic acid group and a wetting agent which does not contain a sulfo group may be employed in the original reaction mixture. In this case the sulfonic acid group will also function as an acid catalyst during the first reaction and may replace, in whole or in part, the oxalic acid catalyst employed in the examples.

The following example illustrates an acid catalyst for the initial condensation, which contains a sulfo group active in the final setting of the resin by some additional reaction.

Example XI

|  | Grams |
| --- | --- |
| p-Phenyl phenol | 945 |
| Formalin | 378 |
| Xylol | 168 |
| p-Toluene Sulfonic Acid | 5 |
| Tween 80 | 100 |

The procedure of the above Example I is employed. The initial reflux period at atmospheric pressure and at 196° to 206° F. was 5 hours and 50 minutes. After distillation of water and solvent the batch was held at 300 F. for 25 minutes. The yield of resin was 1109 grams. The bar melting point was 186° F.

The above example illustrates the preparation of a p-phenyl phenol resin using a wetting agent that does not have a sulfo group and using an acid other than oxalic acid. The phenol-aldehyde molal ratio was 1 to 0.85.

Example XII

|  | Grams |
| --- | --- |
| p-Phenyl phenol | 945 |
| Formalin | 378 |
| Oxalic acid | 3.74 |
| Aerosol O. T. | 3.4 |
| Methyl ethyl ketone | 150 |

The procedure of Example I is employed, the ratio being 1 mole of phenol to 0.85 mole of formaldehyde. The initial reflux period at atmospheric pressure is 4 hours, 40 minutes at 185° to 195° F. After distillation of water and solvent, during 2 hours and 40 minutes, an exothermic reaction becomes evident at 280° F. The batch is held at 285° F. for 30 minutes, giving a resin with bar M. P. of 185° F., yield of 995 grams. The color is deep purple.

The foregoing example illustrates the invention employing a diluent which is completely or partially soluble in water, according to conditions, such as relative proportions, or temperature.

Numerous other changes and modifications of the examples may be practiced without departing from the spirit and scope of the invention as expressed in the appended claims.

I claim:

1. The method of making a resin which comprises mixing p-phenyl phenol, a diluent therefor, a water solution of formaldehyde, an acid catalyst, and a surface active wetting agent, and causing the mixture to react by heating it to a temperature in the range from about 175° F. up to any higher reflux temperature of the mixture, the reactivity of the p-phenyl phenol with the formaldehyde within said temperature range being assisted by the liquifying effect of the diluent upon said phenol, said diluent forming a non-aqueous liquid phase in the reaction mixture and including material selected from the class consisting of phenols which have at least two positions reactive with formaldehyde and also including a volatile organic solvent which is unreactive with formaldehyde and with the phenol and which boils at normal atmospheric pressure at a temperature upwardly from about 175° F. the molal ratio of reactive phenol to formaldehyde in said reaction mixture being in the range from 1 to 0.65 to about 1 to 1.

2. The method of making a resin which comprises mixing p-phenyl phenol, a diluent therefor, a water solution of formaldehyde, an acid catalyst, and a surface active wetting agent, and causing the mixture to react by heating it at atmospheric pressure to a temperature in the range from about 175° F. up to any higher reflux temperature of the mixture, the reactivity of the p-phenyl phenol with the formaldehyde within said temperature range being assisted by the liquefying effect of the diluent upon said phenol, said diluent forming a non-aqueous liquid phase in the reaction mixture and including material selected from the class consisting of volatile organic solvents which are unreactive with formaldehyde and with the phenol and which have normal boiling points at atmospheric pressure upwardly from about 175° F., the molal ratio of reactive phenol to formaldehyde in said reaction mixture being in the range from 1 to 0.65 to about 1 to 1.

3. The method of making a resin which comprises mixing p-phenyl phenol, a diluent therefor, a water solution of formaldehyde, an acid catalyst, and a surface active wetting agent, and causing the mixture to react by heating it at atmospheric pressure to a temperature in the range from about 175° F. up to any higher reflux temperature of the mixture, said diluent being present in an amount sufficient to contain a portion of said phenol in a fluid phase at the reaction temperature to render it reactive with the formaldehyde, said diluent including material selected from the class consisting of phenols which have at least two positions reactive with formaldehyde and also including a volatile organic solvent which is unreactive with formaldehyde and which has a normal boiling point at atmospheric pressure upwardly from about 175° F., the molal ratio of reactive phenol to formaldehyde in said reaction mixture being in the range from 1 to 0.65 to about 1 to 1.

4. The method of making a resin which comprises mixing p-phenyl phenol, a diluent therefor, a water solution of formaldehyde, an acid catalyst, and a surface active wetting agent, and causing the mixture to react by heating it at atmospheric pressure to a temperature in the range from about 175° F. up to any higher reflux temperature of the mixture, the reactivity of the p-phenyl phenol with the formaldehyde within said temperature range being assisted by the liquefying effect of the diluent upon said phenol, said diluent forming a non-aqueous liquid phase in the reaction mixture and consisting of material selected from the class consisting of volatile organic solvents which are unreactive with formaldehyde and with the phenol and which have normal boiling points at atmospheric pressure upwardly from about 175° F., the molal ratio of reactive phenol to formaldehyde in said reaction mixture being in the range from 1 to 0.65 to about 1 to 1.

5. The method of making a resin which comprises mixing p-phenyl phenol, a diluent therefor, a water solution of formaldehyde, an acid catalyst, and a surface active wetting agent containing a sulfo group, causing the mixture to react by heating it at atmospheric pressure to a temperature in the range from about 175° F. up to any higher reflux temperature of the mixture, distilling volatile material including water and diluent from the mass by the application of heat, continuing the application of heat to bring the mass to a temperature in the range from about 225° to about 310° F. whereby an exothermic reaction occurs which assists in raising the temperature of the mass and increases the melting point of the resulting resin, and cooling and recovering the resin at a point after the beginning of the exothermic reaction, the reactivity of the p-phenyl phenol with the formaldehyde during the initial reaction being assisted by the liquefying effect of the diluent upon said phenol, said diluent forming a non-aqueous liquid phase in the reaction mixture and including material selected from the class consisting of phenols which have at least two positions reactive with formaldehyde and also including a volatile organic solvent which is unreactive with formaldehyde and with the phenol and which has a normal boiling point at atmospheric pressure upwardly from about 175° F., the molal ratio of reactive phenol to formaldehyde in said reaction mixture being in the range from 1 to 0.65 to about 1 to 1.

6. The method of making a resin which comprises mixing p-phenyl phenol, a water solution of formaldehyde, a diluent material for the p-phenyl phenol which material is volatile and unreactive with formaldehyde, and of which diluent material an appreciable portion is chemically inert in the reaction and initially insoluble at the initial reaction temperature in the said water solution of formaldehyde, an acid catalyst, and a water-soluble surface active wetting agent, and causing said phenol of the mixture to react with said formaldehyde of the mixture by heating the mixture to a temperature in the range from about 175° F. to any higher reflux temperature of the mixture at atmospheric pressure, while having initially an aqueous liquid phase containing formaldehyde and while forming initially in contact therewith a second and fluid phase comprising at least the said insoluble portion of said diluent material and a part of said p-phenyl phenol, in which second phase the content of p-phenyl phenol is readily reactive with formaldehyde, the reactivity of the p-phenyl phenol with the formaldehyde at the reaction temperature being enhanced by the liquefying effect of the diluent material upon said p-phenyl phenol in the said second phase and by the presence of the said wetting agent dissolved in the aqueous phase, the molal ratio of reactive phenol to formaldehyde in said reaction mixture being in the range from 1 to 0.65 to about 1 to 1.

7. The method of making a resin which comprises mixing p-phenyl phenol, a water solution of formaldehyde, an acid catalyst, a surface active wetting agent containing a sulfo group, and xylol, causing the mixture to react by heating it at atmospheric pressure to a temperature in the range from about 175° F. up to any higher reflux temperature of the mixture, distilling xylol and water from the mass by the application of heat to bring the mass to a temperature in the range from about 225° to about 310° F. whereby to raise the melting point of the resulting resin, and cooling and recovering the resin, the reactivity of the p-phenyl phenol with the formaldehyde being assisted by the solvent effect of the xylol upon said phenol, the xylol being present in an amount sufficient to contain only a portion of said phenol in a fluid phase at the initial reaction temperature, the molal ratio of reactive phenol to formaldehyde in said reaction mixture being in the range from 1 to 0.65 to about 1 to 1.

8. The method of making a resin which comprises mixing p-phenyl phenol, a water solution of formaldehyde, an acid catalyst, a surface active wetting agent containing a sulfo group, and benzol, causing the mixture to react by heating it at atmospheric pressure to a temperature in the range from about 175° F. up to any higher reflux temperature of the mixture, distilling benzol and water from the mass by the application of heat to bring the mass to a temperature in the range from about 225° F. to about 310° F. whereby to raise the melting point of the resulting resin, and cooling and recovering the resin, the reactivity of the p-phenyl phenol with the formaldehyde being assisted by the solvent effect of the benzol upon said phenol, the benzol being present in an amount sufficient to contain only a portion of said phenol in a fluid phase at the initial reaction temperature.

9. The method of making a resin which comprises mixing p-phenyl phenol, a water solution of formaldehyde, an acid catalyst, a surface active wetting agent containing a sulfo group, and a solvent selected from the class consisting of volatile hydrocarbon solvents for p-phenyl phenol which have normal boiling points in the range from about 175° to about 375° F., causing the mixture to react by heating it at atmospheric pressure to a temperature in the range from about 175° F. up to any higher reflux temperature of the mixture, distilling hydrocarbon solvent and water from the mass by the application of heat to bring the mass to a temperature in the range from about 225° to about 310° F. whereby to raise the melting point of the resulting resin, and cooling and recovering the resin, the reactivity of the p-phenyl phenol with the formaldehyde being assisted by the solvent action of the hydrocarbon solvent upon said phenol, the solvent being present in an amount sufficient to contain only a portion of said phenol in a fluid phase at the initial reaction temperature, the molal ratio of reactive phenol to formaldehyde in said reaction mixture being in the range from 1 to 0.65 to about 1 to 1.

JAMES A. ARVIN.

REFERENCES CITED

The following references are of record in the file of this patent:

UNITED STATES PATENTS

| Number | Name | Date |
| --- | --- | --- |
| 2,049,447 | Honel | Aug. 4, 1936 |
| 2,093,481 | Rosenblum | Sept. 21, 1937 |
| 2,101,944 | Honel | Dec. 14, 1937 |
| 2,146,004 | Arvin | Feb. 7, 1939 |
| 2,173,346 | Turkington et al. | Sept. 19, 1939 |
| 2,330,217 | Hunn | Sept. 28, 1943 |

FOREIGN PATENTS

| Number | Country | Date |
| --- | --- | --- |
| 476,628 | Great Britain | Dec. 8, 1937 |

Certificate of Correction

Patent No. 2,463,501.

March 8, 1949.

JAMES A. ARVIN

It is hereby certified that errors appear in the printed specification of the above numbered patent requiring correction as follows:

Column 9, Table 4, first column thereof, seventh item, for "Hoding" read *Holding*; column 10, line 4, for "p-phenol" read *p-phenyl*; column 11, line 30, for "aboxe" read *above*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*